United States Patent
Ruggie et al.

[11] Patent Number: 5,887,402
[45] Date of Patent: Mar. 30, 1999

[54] METHOD OF PRODUCING CORE COMPONENT, AND PRODUCT THEREOF

[75] Inventors: Mark A. Ruggie, Franklin Park; Steven K. Lynch, St. Charles; Keith S. Fischer, Carol Stream, all of Ill.; James J. Pelletier, Lisbon, Me.; John B. Stukenborg, Kankakee, Ill.

[73] Assignee: Masonite Corporation, Chicago, Ill.

[21] Appl. No.: 472,330

[22] Filed: Jun. 7, 1995

[51] Int. Cl.⁶ ........................................ E04C 2/16
[52] U.S. Cl. ...................... 52/455; 52/784.11; 52/784.15; 52/794.1; 52/745.15; 52/745.16; 264/118; 264/119; 264/251; 428/162; 428/165
[58] Field of Search .................... 52/455, 784.1, 52/784.11, 784.15, 784.16, 794.1, 795.1, 797.1, 802.1, 802.11, 784.14, 309.1, 309.3, 309.13, 309.14, 309.15, 311.1, 783.1, 746.1, 742.12, 745.15, 745.16; 264/35, 46.4, 46.6, 118, 119, 128, 162, 251, 112, 139, 293; 156/219, 220; 428/156, 162, 163, 165, 168, 187

[56] References Cited

U.S. PATENT DOCUMENTS

| | | |
|---|---|---|
| Re. 24,558 | 10/1958 | Tyree . |
| 670,939 | 4/1901 | Rapp ........................................ 52/784.1 |
| 877,922 | 2/1908 | Gager ...................................... 52/455 X |
| 937,430 | 10/1909 | Evans, Jr. . |
| 1,183,842 | 5/1916 | Alling . |
| 2,511,620 | 6/1950 | Clements . |
| 2,797,450 | 7/1957 | Ropella ................................. 52/455 X |
| 3,287,855 | 11/1966 | Hallonquist et al. . |
| 3,385,002 | 5/1968 | Quinif . |
| 3,525,663 | 8/1970 | Hale . |
| 3,527,664 | 9/1970 | Hale . |
| 3,597,891 | 8/1971 | Martin . |
| 3,635,784 | 1/1972 | Snitker . |
| 3,793,125 | 2/1974 | Kunz ................................... 264/112 X |
| 3,834,487 | 9/1974 | Hale . |
| 3,898,120 | 8/1975 | Snitker . |
| 3,899,860 | 8/1975 | Newell ................................ 52/784.1 X |
| 3,938,963 | 2/1976 | Hale . |
| 4,104,828 | 8/1978 | Naslund et al. .................. 52/784.11 X |
| 4,142,007 | 2/1979 | Lampe et al. ............................ 428/165 |
| 4,146,662 | 3/1979 | Eggers et al. ............................. 428/68 |
| 4,148,857 | 4/1979 | Wheeler . |
| 4,175,150 | 11/1979 | Luck et al. . |
| 4,236,365 | 12/1980 | Wheeler . |
| 4,248,163 | 2/1981 | Caughey .............................. 264/119 X |
| 4,265,067 | 5/1981 | Palmer . |
| 4,268,565 | 5/1981 | Luck et al. ............................... 428/161 |
| 4,305,989 | 12/1981 | Luck et al. . |
| 4,544,440 | 10/1985 | Wheeler ................................... 156/634 |

(List continued on next page.)

FOREIGN PATENT DOCUMENTS

| | | | |
|---|---|---|---|
| 648174 | 9/1992 | Australia ............................... 428/156 |
| 103048 | 3/1984 | European Pat. Off. ................. 52/455 |
| 1042466 | 11/1953 | France .................................... 52/316 |

OTHER PUBLICATIONS

Maloney, Modern Particleboard and Dry Process Fiberboard Manufacturing, pp. 31–33, 420–424, dated 1977.

Product Bulletin for "Weyerhaeuser Particleboard Door Core," p. 2, dated Nov. 91.

*Primary Examiner*—Carl D. Friedman
*Assistant Examiner*—Laura A. Callo
*Attorney, Agent, or Firm*—Marshall, O'Toole, Gerstein, Murray & Borun

[57] ABSTRACT

A core component is shaped to compensate for varying widths and depths of the shell or framing of a building or structural member. The component includes two major surfaces defining respective front and rear sides of the component, and the rear side of the component is preferably the mirror image of the front side. The core component is preferably pre-formed and provided in a space or void on the interior of building or structural members, e.g., two prefabricated molded doorskins. The core component is preferably made from a composite soft board material. Processes for the production of a core component and a building member such as a composite door product are also disclosed.

41 Claims, 6 Drawing Sheets

U.S. PATENT DOCUMENTS

| | | |
|---|---|---|
| 4,583,338 | 4/1986 | Sewell et al. . |
| 4,630,420 | 12/1986 | Hagemeyer . |
| 4,643,787 | 2/1987 | Goodman ................... 52/784.15 X |
| 4,706,431 | 11/1987 | Corvese ................... 52/313 |
| 4,811,538 | 3/1989 | Lehnert et al. . |
| 4,853,062 | 8/1989 | Gartland ................... 156/219 |
| 4,896,471 | 1/1990 | Turner ................... 52/455 |
| 4,922,660 | 5/1990 | Omelchuk . |
| 4,935,281 | 6/1990 | Tolbert et al. . |
| 5,142,835 | 9/1992 | Mrocca ................... 52/309.14 X |
| 5,167,105 | 12/1992 | Isban et al. . |
| 5,219,634 | 6/1993 | Aufderhaar ................... 428/156 |
| 5,242,735 | 9/1993 | Blankenburg et al. . |
| 5,262,217 | 11/1993 | Blaauw ................... 52/794.1 X |
| 5,264,062 | 11/1993 | Ohsumi et al. . |
| 5,266,379 | 11/1993 | Schaeffer et al. . |
| 5,397,406 | 3/1995 | Vaders et al. ................... 264/293 X |
| 5,439,749 | 8/1995 | Klasell et al. . |
| 5,470,631 | 11/1995 | Lindquist et al. ................... 428/165 X |

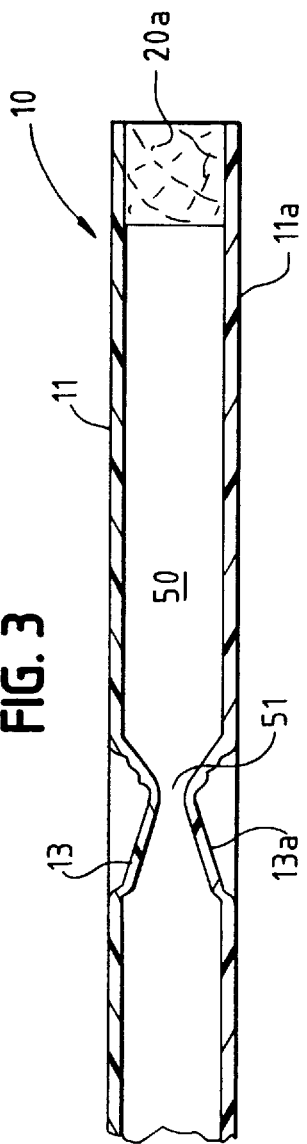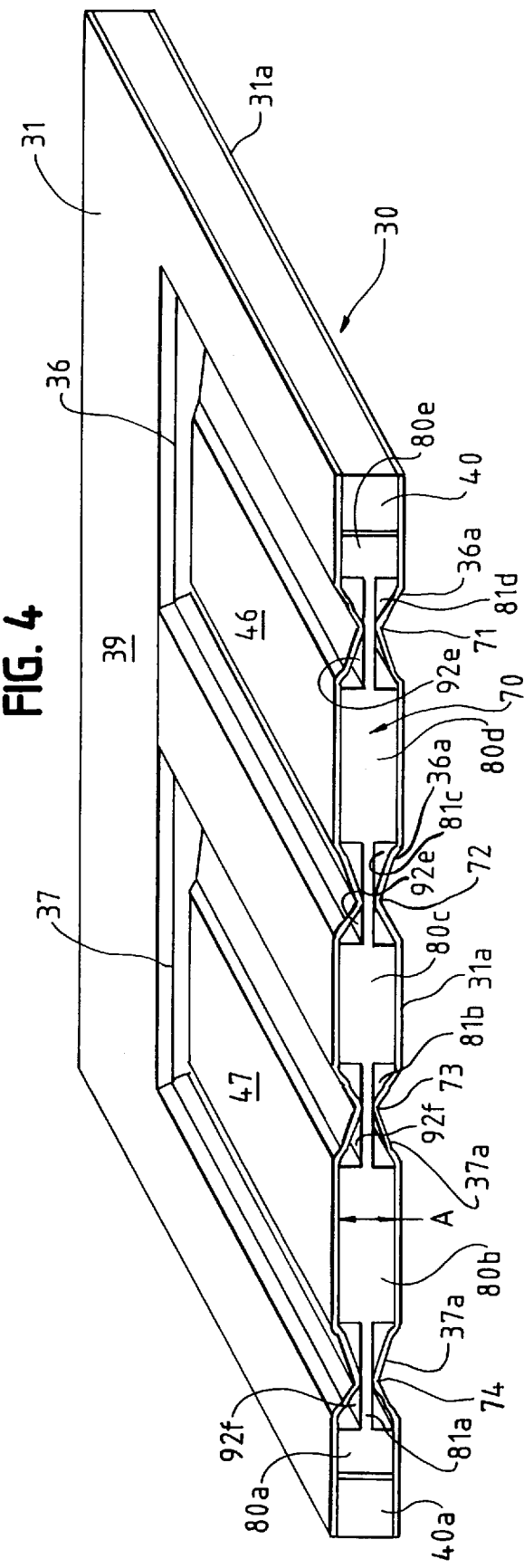

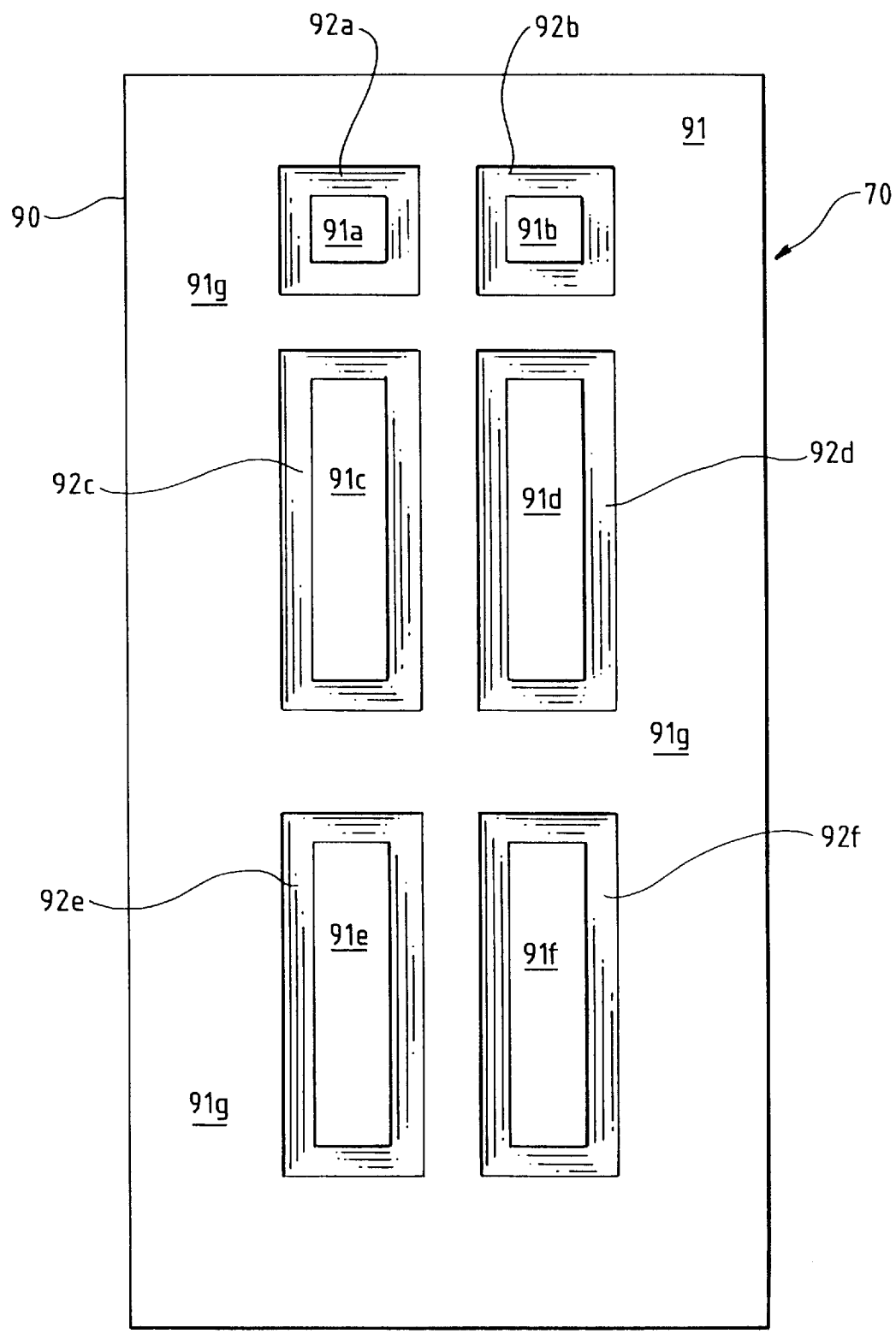

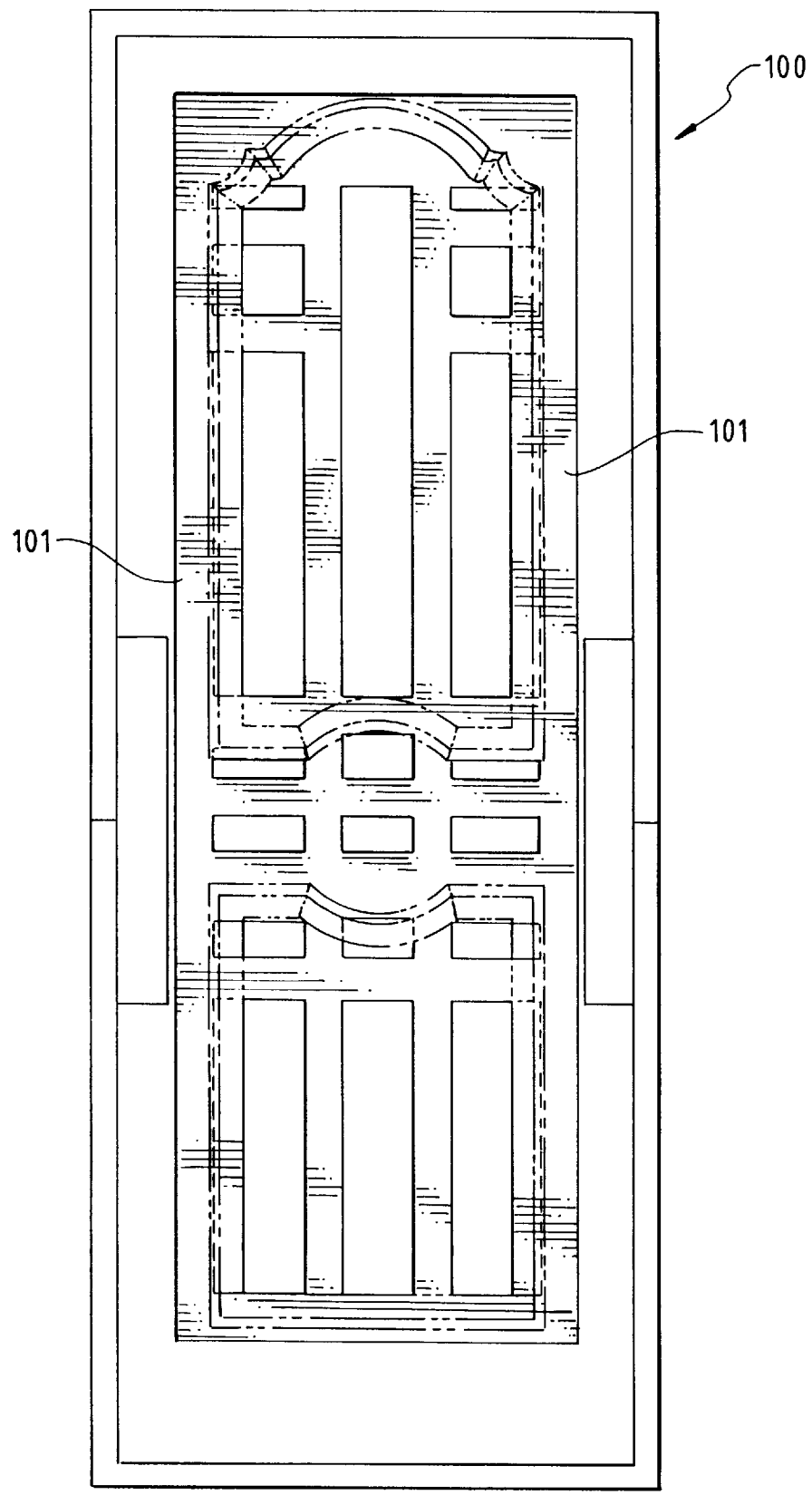

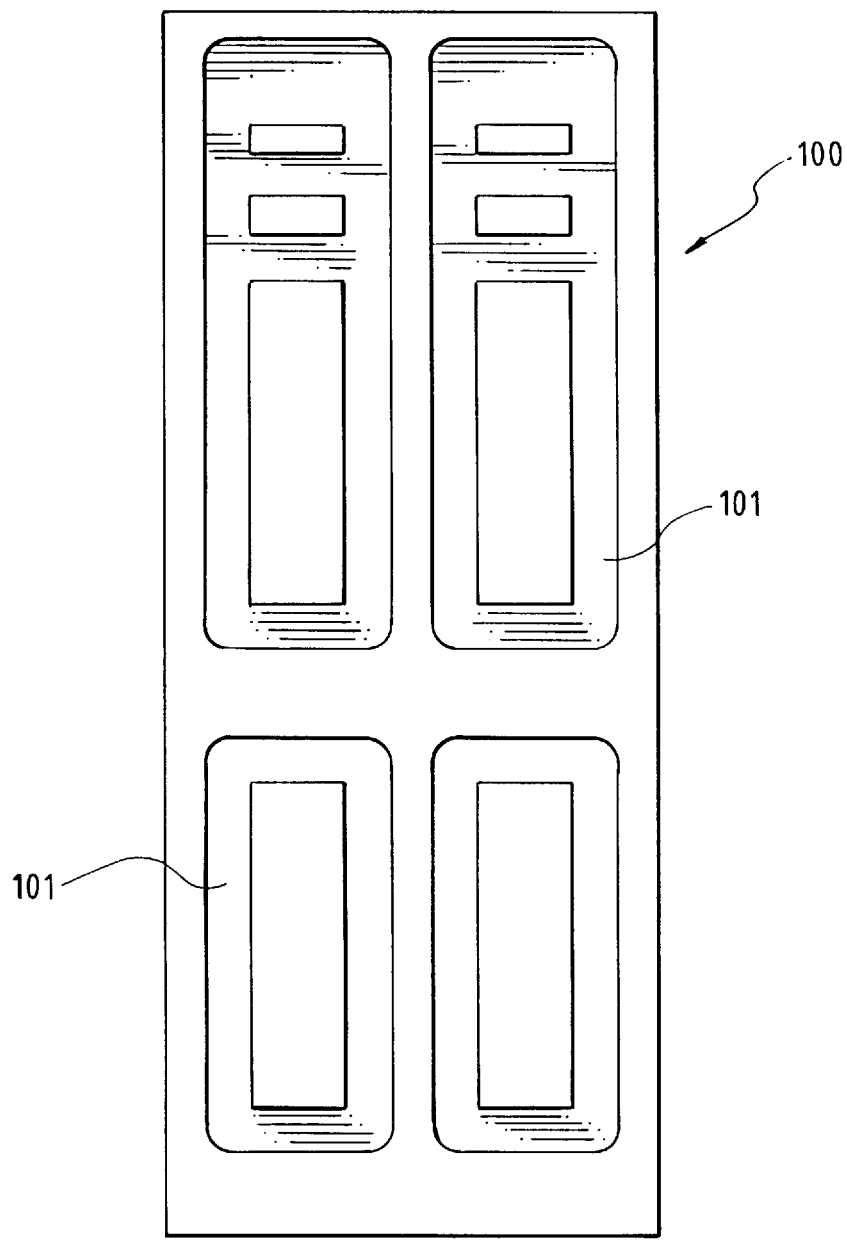

METHOD OF PRODUCING CORE COMPONENT, AND PRODUCT THEREOF

BACKGROUND OF THE INVENTION

1. Field of the Invention

The invention relates generally to the production of man-made composite structural and building products. More particularly, the invention relates to the production of a cellulosic core component which can be utilized, for example, in an interior space or void formed by the shell or framework of a building product, e.g., composite doorskins.

2. Brief Description of Related Technology

Man-made boards, such as fiberboard, can be embossed or molded to have three-dimensional shapes and various design and structural features found in natural wood. Types of useful man-man boards are referred to by the following terms, for example: (a) fiberboards such as hardboard (e.g., low-density hardboard), soft board, and medium-density fiberboard and (b) chipboards such as particleboard, medium-density particleboard, and oriented strandboard ("OSB"). Composites of these boards are also useful. Such boards, particularly hardboard, have found widespread use in the manufacture of doorskins, which can be glued together or laminated to form a shell which supports or encloses a structure or a frame.

Commonly, doorskins (also referred to as door faces) are molded from a planar cellulosic mat to include one or more interior depressions or contours, such as one or more square or rectangular depressions which do not extend to the outer edge or periphery of the doorskin product. Doorskins often require inclined molded walls having a plurality of contours that include varied curved and planar surfaces. Where the depressions or contours are included on a doorskin product, this can serve to replicate a more expensive natural wood paneled door. For example, doors having two, three, four, five, and six panel designs are commonly produced. The exterior or visible surfaces of the fiberboard also can be embossed with a design that represents a wood grain pattern found in a natural piece of wood.

The principal processes for the manufacture of wood composites such as doorskins and other structural or building products include (a) wet felted/wet pressed or "wet" processes, (b) dry felted/dry pressed or "dry" processes, and (c) wet felted/dry pressed or "wet-dry" processes.

Generally in a wet process, cellulosic fillers or fibers (e.g., woody material which is subjected to fiberization to form wood fibers) are blended in a vessel with large amounts of water to form a slurry. The slurry preferably has sufficient water content to suspend a majority of the wood fibers and preferably has a water content of at least ninety percent by weight ("weight percent") of the wood fibers. The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty weight percent, based on the dry weight of the fibers. The wet mat is transferred from the pervious support member to a press and consolidated under heat and pressure to form the molded wood composite.

A wet-dry forming process can also be used to produce cellulosic composites. Preferably, a wet-dry process begins by blending cellulosic or wood fiber raw material in a vessel with large amounts of water having a pH of less than seven to form a slurry. This slurry is then blended with the resin binder. As in the wet process described above, the blend is then deposited onto a water-pervious support member, where a large percentage of the water is removed, thereby leaving a wet mat of cellulosic material having a water content of about fifty weight percent, for example. This wet mat is then transferred to an evaporation zone where much of the remaining water is removed by evaporation. The dried mat preferably has a moisture content of less than about thirty weight percent. The dried mat is then transferred to a press and consolidated under heat and pressure to form the wood composite which may be, for example, a flat board, a doorskin, or any other desired shape depending on the intended use of the product.

In a dry process, the cellulosic fibers are generally conveyed in a gaseous stream or by mechanical means rather than a liquid stream. For example, the cellulosic fibers may be first coated with a thermosetting resin binder, such as a phenol-formaldehyde resin. The fibers are then randomly formed into a mat by air blowing the resin-coated fibers onto a support member. The mat may optionally be subjected to pre-press drying. The mat, typically having a moisture content of less than about thirty weight percent and preferably less than about ten weight percent, is then pressed under heat and pressure to cure the thermosetting resin and to compress the mat into an integral consolidated structure.

The fiber mats formed by the above-described methods can be pressed into a pre-selected decorative shape, typically at a thickness of about one-eighth of an inch. As stated above, in the case of a composite door product, the decorative shape generally includes one or more panels and/or other contours in the doorskin, as described above. Two doorskin pieces are typically joined together with an adhesive binder, which is placed at least at the contact points along the periphery of the door assembly formed by the doorskins. Because the doorskin pieces are contoured, an open, interior space of varying dimensions is formed by the doorskin assembly.

Doorskin pieces are often not used alone, but in conjunction with some other material(s) to add support to the final door product. The doorskin pieces often utilize wood framing at or near the perimeter of the assembled doorskin. It is known to use rails and stiles, which, when attached together, can provide additional structural support for the door. Rails can be generally described as horizontally-oriented beams which provide support for the door. Stiles, on the other hand, can be generally described as longitudinal or vertically-oriented beams which provide support for the door. In addition, a lock block is optionally utilized to provide further support for a door handle and/or a locking mechanism (e.g., a so-called "dead bolt") at the periphery of the door. The lock block is preferably secured to a stile and/or a rail.

However, although the structure of a man-made composite door product is supported with rails and stiles, often the door still will not perform as well as a natural solid wood door because the interior spaces defined by the doorskins will be substantially hollow or empty. The hollow spaces or voids cause the door to be lighter than is generally preferred. Further, it is often found that the sound insulation provided by such doors may not be satisfactory. Thus, it is often desirable to use a core material (e.g., core pieces or components) to fill these hollow spaces.

In the past, core materials made of corrugated cardboard and/or paper have been used. However, it has sometimes found that the sound insulation provided by doors using such core materials may not be satisfactory.

A suitable core material should also provide the door product with a desirable weight, for example the weight of a similarly-styled natural solid wood door. A typical, thirty-inch wide solid pine door weighs approximately forty-two pounds. Known core materials and components have the disadvantage, for example, that they often fall far short of the desired weight. In addition, some alternatives to doorskins having a core material (e.g., full thickness particleboard doors) produce a door that is too heavy and/or difficult to manufacture. In addition, a core material should provide the door with a relatively even weight distribution.

The core material should also have characteristics (e.g., size and shape) that allow placement and attachment within the interior spaces formed by the doorskin assembly. As described above, doorskins, particularly for paneled doors, are commonly molded to include one or more interior depressions (i.e., on the surface at some distance from the periphery), such as one or more square or rectangular depressions that do not extend to an outer edge of the doorskin. These surface depressions create varying depths (measured from the front face to the back face of the door) of the interior void formed by a pair of assembled doorskins. When placing a core material or component on the interior of the doorskin assembly, it is therefore necessary to compensate for the varying depth of the interior void.

Another problem with known core components is that different styles of door (e.g., two-, three-, four-, five-, and six-panel models) will have different patterns of hollow spaces or voids. Thus, a door manufacturer has generally been required to have readily available various sizes and patterns of core components for the different models of doorskins it wishes to use. This is undesirable because such a system requires (a) various different machinery (e.g., dies) to make the varying types of core materials and (b) the stocking of multiple sizes of the produced core materials. Such necessities make the manufacturing process more complicated and expensive. It would therefore be desirable to have a single core component design which could be used for multiple designs of doors.

SUMMARY OF THE INVENTION

It is an object of the invention to overcome one or more of the problems described above.

Accordingly, the invention provides a core component that can provide various beneficial properties to various building components, such as doors. The core component is a contoured article having two major exterior surfaces defining respective front and rear sides thereof. There is at least one depression or contour in the major planar surface, and the rear side of the component is preferably the mirror image of the front side. In one embodiment, the depressions each include (a) first and second inclined depression walls extending downwardly from the major plane and (b) a depression bottom extending between the inclined depression walls.

According to a preferred embodiment, a door core component is adapted for placement on the interior of a pair of doorskins defining an interior space or void, so as to provide a composite door with various improved characteristics, including, for example, beneficial weight, strength (e.g., rigidity), sound insulation, and fire insulation properties. The invention provides a core component made of a composite soft board material.

The invention also provides a rigid building or structural member having one or more interior spaces or voids, such as a door product, utilizing the inventive core component. The shell or exterior of the building member, as well as the core component, is preferably made of a composite cellulosic material. The core component can be secured on the interior of the building member with an adhesive. The invention also provides a process of producing such a building member.

In one embodiment of the invention, the core component includes a feature wherein a single design of core component can be utilized in various styles of building member shells. Preferably, this feature includes providing contours or depressions to the core component, such that a core component having a single design can fit into the hollow spaces or voids found in multiple styles of paneled (e.g, six-paneled) and/or contoured doors, for example.

Further objects and advantages of the invention will be apparent to those skilled in the art from the following detailed description, taken in conjunction with the drawings and the appended claims.

BRIEF DESCRIPTION OF THE DRAWINGS

FIG. 3 is a cross-sectional view taken along line 3—3 of FIG. 1 illustrating the details of the concave and convex curves in the faces of the door.

FIG. 4 is a cross-sectional view taken along line 4—4 of FIG. 2 of a paneled composite door, having perimeter framing and a door core component in accordance with the invention.

FIG. 6 is an elevated perspective view of a core component in accordance with the invention.

FIG. 7 is an elevated perspective view of a core component in accordance with the invention wherein the component can be utilized with multiple styles of paneled doorskins.

FIG. 8 is an elevated perspective view of an alternative embodiment of a core component in accordance with the invention wherein the component can be utilized with multiple styles of paneled doorskins.

DETAILED DESCRIPTION OF THE INVENTION

Figure 1:
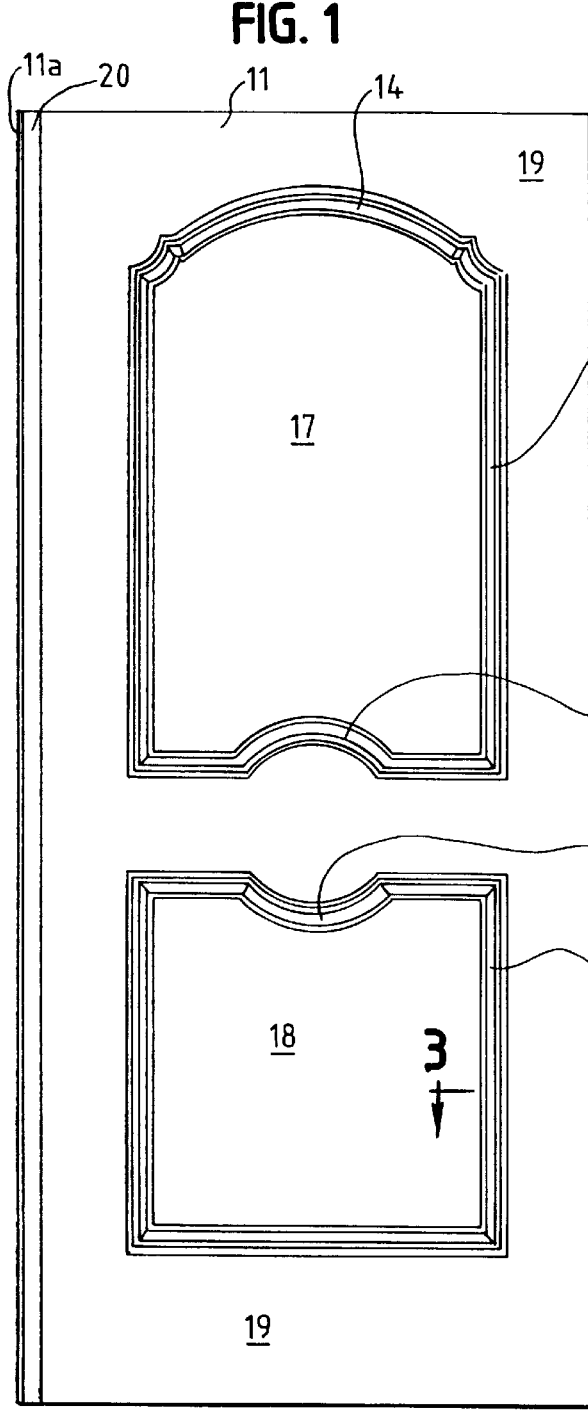
FIG. 1 is an elevated perspective view of an embodiment of a two-panel door in accordance with the invention.

According to the invention, a core component or insert is provided that can be placed on interior voids or spaces formed by structural or building members such as doors, so as to provide beneficial characteristics thereto.

As used herein, the term "building or structural member" includes any building article that contains a void or space on an interior thereof and with which it is desirable to include a core component. For example, it can be desirable to place a core component in the interior voids of any of the following: various types of interior wall members or sections, exterior wall members or sections, partition members or sections, furniture components, vehicle components, packaging components, and many types of doors. It is not necessary that the structural member be completely enclosed around its entire perimeter in order to create a void, as the term is used herein. The inventive core component can be useful with a structural member which has a void exposed to the atmosphere, but which void will not be visible in the final product. In other words, a box lacking one or more of its sides can still define a void. The core component can also act as a backing or enclosing member for a structural member.

The inventive core component is preferably used in conjunction with the manufacture of a door product, and more preferably in the manufacture of a door product including composite doorskins made of fiberboard or another man-made board material. As described above, such doorskin articles are commonly molded from a planar cellulosic mat to include one or more interior depressions along the surface of the article, such as one or more square, rectangular, and/or curved depressions that do not extend to an outer edge of the article. The core component of the invention can compensate for the varying depth of the interior void, caused by the depressions in the doorskin.

The inventive core component is preferably a pre-consolidated or pre-formed cellulosic article that aids in providing beneficial properties to the doorskin or other building member. The core component preferably includes one or more contoured portions that compensate for contours in man-made composite doorskins. In a particular preferred embodiment, soft board wood "blanks" are used to fill the void space in hollow core construction passage doors using various doorskins.

The core component can be a flat board material lacking interior depressions. Such full-thickness core components can be placed on the interior of a flush or flat door (i.e., lacking simulated panels). A flat, three foot by seven foot door using a flat core component made of a soft board material can provide beneficial fire retardance properties. For example, it has been found that such a door can have a fire retardance rating of twenty minutes (a so-called "twenty minute fire door"). This rating is based on the "Fire Endurance and Hose Stream Test" performed by Inchcape Testing Services-Warnock Hersey of Pittsburg, Calif.

Various embodiments of the invention are described below with reference to the drawings. Initially referring to FIG. 1, there is illustrated a door, generally designated 10, which includes a front doorskin 11 and an identical, rear doorskin 11A, secured to opposite major surfaces of a door frame or interior support structure or framing member 20. (Only the side edge of the rear doorskin 11A is visible in FIG. 1.) The framing member 20, known as a stile, can be made of natural wood, man-made pressed wood, or any other suitable material. The doorskins 11 and 11A are preferably molded so as to impart aesthetic surface contours in the visible outer surfaces that correspond to essentially identical contours of a mold cavity (not shown). The doorskins 11 and 11A are preferably secured, e.g., with an adhesive, to a core component in accordance with the invention.

The doorskins shown in the drawings are molded to simulate multi-panel door surfaces. The embodiment shown in FIG. 1 contains two molded depressions 12 and 13 (having curved portions 14, 15, and 16) that define and surround two panels 17 and 18, respectively. The panels 17 and 18 are preferably coplanar. Each of the depressions 12 and 13 is completely surrounded by a substantially planar (e.g., horizontal) door surface portion 19. Preferably, the panels 17 and 18 lie in the same plane as the door surface portion 19; however, this need not be the case.

Figure 2:
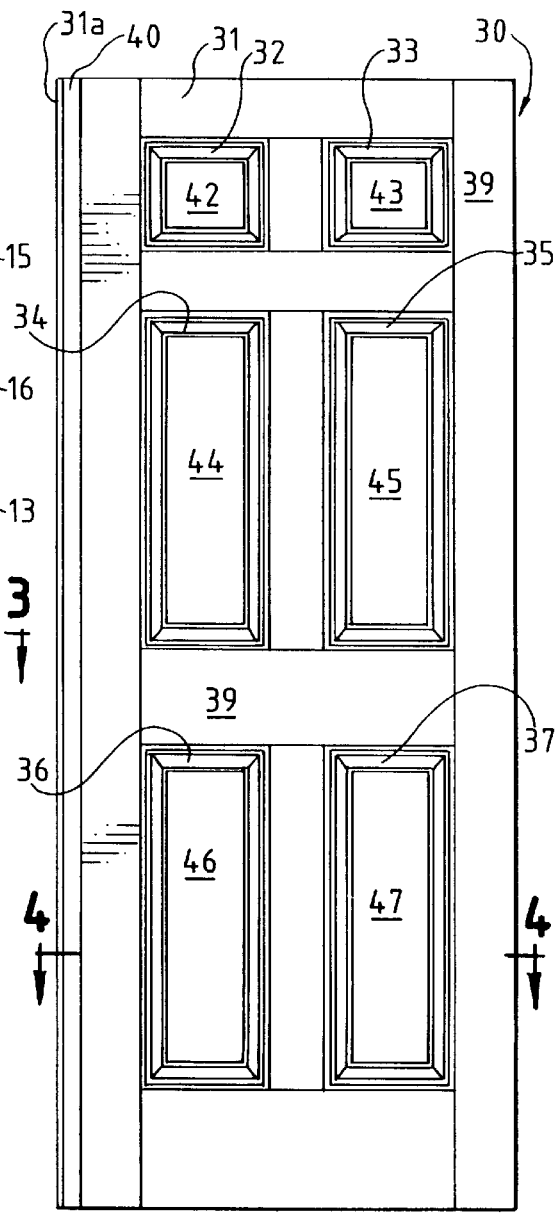
FIG. 2 is an elevated perspective view of an embodiment of a six-panel door in accordance with the invention.

FIG. 2 illustrates a simulated six-panel door 30. Similar to the two-panel door illustrated in FIG. 1, the door 30 has a front doorskin 31 and a rear doorskin 31A supported by a framing member 40 (e.g., a stile). The doorskin 31A can be identical to the doorskin 31. The door 30 has six depressions 32, 33, 34, 35, 36, and 37 that are rectangular in shape. The rectangular depressions completely surround six simulated horizontal door panels 42, 43, 44, 45, 46, and 47, respectively. Each of the depressions 32–37 is completely surrounded by a substantially planar (e.g., vertical) door surface portion 39. The panels 42–47 can lie in the same plane as the surface portion 39. Optionally, the door panels 42–47 can lie in a plane different from the plane of the portion 39. Nevertheless, the surfaces 39 and 42–47 can be referred to generally as the major planar surface of the doorskin 31.

In the two-panel door shown in FIG. 1, the depressions each have a rectangular shape that has been altered with the curved portions 14, 15, and 16. Otherwise, the door of FIG. 1 has characteristics similar to the six-panel door shown in FIG. 2.

Referring now to FIG. 3, there is illustrated a cross-sectional view of the door of FIG. 1 taken along line 3—3 of FIG. 1. This drawing illustrates some of the details of the curvatures in the faces 11 and 11A of the door 10 of FIG. 1. As described above, the doorskins 11, 11A are attached to a stile 20A which is parallel to the stile 20 of FIG. 1. As shown in FIG. 3, the doorskins 11 and 11A define an interior space or void 50 therebetween.

In FIG. 3, the depression 13, along with a depression 13A on the rear doorskin 11A, causes the void 50 to have a narrower depth (measured from a point on doorskin 11 along a line perpendicular to the doorskin 11 to a point on doorskin 11A) than the depth at other locations of the door of FIG. 3. This location is referred to herein as a constriction 51. An object of the invention is to provide a one-piece core component in the void 50 that can provide sufficient weight properties and sound insulation properties to the final product, while compensating for the constriction 51 at the location of depressions 13 and 13A, for example.

FIG. 4 illustrates a cross-section through a line 4—4 of the paneled door 30 of FIG. 2. As described above, the paneled door 30 includes the doorskins 31 and 31A. The door 30 includes the stiles 40 and 40A and a door core component, generally designated 70. Shown in FIG. 4 are the contoured depressions 36 and 37 that define and surround the raised panels 46 and 47, respectively. The bottom doorskin 31A has contoured depressions 36A and 37A. As with the door portion shown in FIG. 3, the depressions 36 and 36A define constrictions 71 and 72 at the locations indicated in FIG. 4. Similarly, the depressions 37 and 37A define constrictions 73 and 74 at the indicated locations.

As shown in FIG. 4, the core component 70 includes five portions 80A, 80B, 80C, 80D, and 80E, which are relatively deeper than intermediate segments 81A, 81B, 81C, and 81D (i.e., the portions 80 have a greater dimension measured from opposite major surfaces in contact with the interior of the doorskins 31 and 31A). The relatively thin or narrow segments 81 allow the core component 70 to continuously extend through, and fit into, the constrictions 71–74. Thus, one advantage of the invention is that it provides a single, pre-consolidated article that can be placed on the interior of a doorskin.

The portions 80 of the core 70 have a depth measured by a perpendicular line segment from one exterior surface (not shown in FIG. 4) of the portion 80 in contact with the doorskin 31 to the opposite exterior surface of the portion 80 in contact with the doorskin 31A. (Such a measurement can be made along the line segment "A" in FIG. 4.) This depth can be, for example, in the range of about 1⅛ inch to about 1¾ inch, e.g., about 1⅜ inch. The relatively thin segments 81 can each have a depth, for example, in the range of about ⅛ to about ½ inch, e.g., about ⅜ inch (measured along lines parallel to the line segment "A" in FIG. 4). The segments 81 preferably intersect with the portions 80 so that the depth differential therebetween is equally divided above and below the segments 81, as shown in FIG. 4. In the embodiment of FIG. 4, the segments 80 and 81 intersect at an angle of about ninety degrees. However, these measurements are completely variable depending, for example, upon (a) the type of product in which the core component 70 is used, (b) the type of material used to make the core component 70, and (c) the weight and sound insulation properties which are desired in the final product. However, it is highly preferred that at least the portions 80 of the core are in substantially continuous contact with (e.g., secured to) the interior of the doorskins 31 and 31A.

Figure 5:
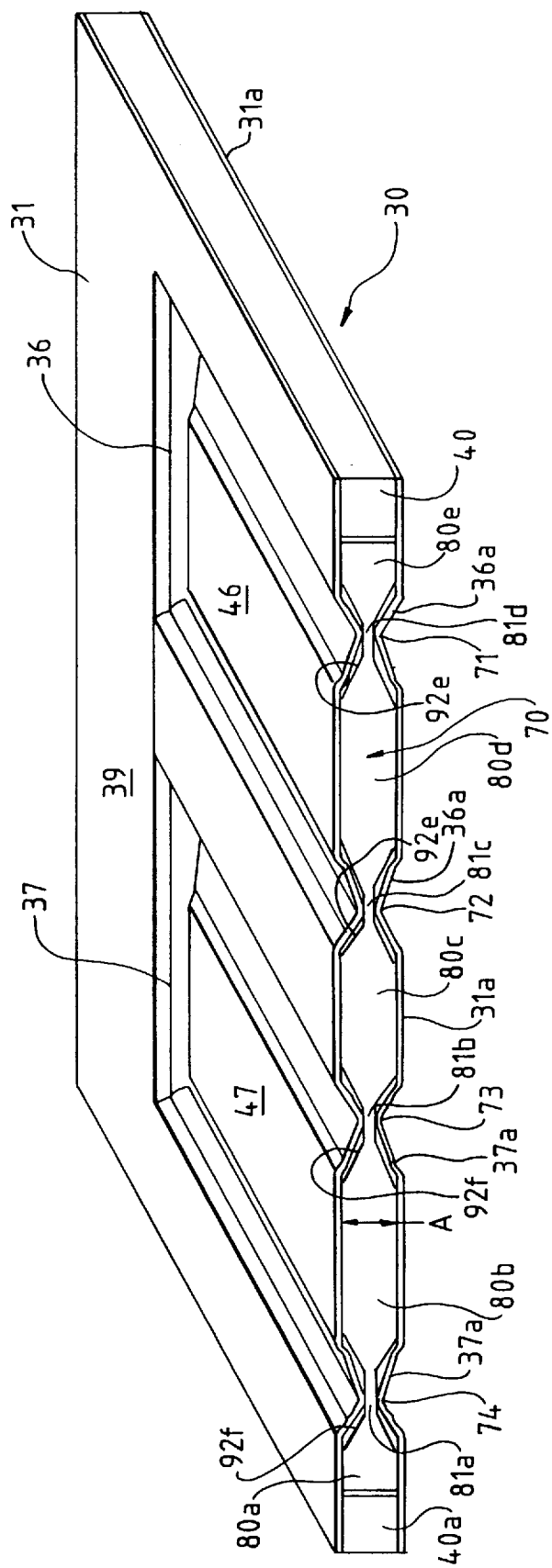
FIG. 5 is a cross-sectional view taken along line 4—4 of FIG. 2 of a paneled composite door, having perimeter framing and an alternative door core component in accordance with the invention.

FIG. 5 shows an alternative embodiment which provides a door having improved fire retardance. In this embodiment, the segments 80 and 81 intersect at an angle of less than ninety degrees, providing a core component that more closely fits the contours of the depressions 36, 37 of the doorskins 31 and 31A. The angle of intersection of the segments 80 and 81 is preferably in the range of about twenty to about ninety degrees, more preferably about thirty to about fifty degrees, and most preferably about forty degrees. The angle is variable, however, depending upon the shape of the depressions 36 and 37.

It has been found that this arrangement produces a door having improved fire retardance, particularly when the core component is made of a soft board material. For example, a one and one-half inch thick door having this arrangement can have a fire retardance rating of about twenty minutes, based on the aforementioned "Fire Endurance and Hose Stream Test" performed by Warnock Hersey. The door achieves such a rating without treatment with fire-retardant chemicals by slowing the ability of air to flow through the space defined by the doorskins 31, 31A, which in turn retards the ability of flames to burn through the door. The greater mass provided by such an arrangement may also help in providing such improved fire retardance.

FIG. 6 illustrates another view of the core component 70 manufactured in accordance with the invention. The core component 70 has an outer edge 90, and includes an upper, substantially planar major surface (generally referred to as element 91). The upper major surface 91 includes upper surface portions 91A, 91B, 91C, 91D, 91E, 91F, and 91G. The upper surface portion 91G surrounds six relatively lower contoured portions or recesses 92A, 92B, 92C, 92D, 92E, and 92F. (The top surfaces of the recesses 92E and 92F define the top surfaces of the segments 81A, 81B, 81C, and 81D shown in FIG. 4.) The recesses 92A–92F in turn surround the aforementioned upper surface portions 91A–91F.

The core component 70 can be placed in the interior of a simulated six-panel hardboard doorskin because the recesses 92A–92F are located in the areas corresponding to the depressions outlining the panels in a six-panel door, for example the six-panel door of FIG. 2. Referring to FIGS. 4 and 5, for example, the void created by the doorskins 31 and 31A can be filled by a single component 70 both at the constrictions 71–73 and the locations where the depth of the door 30 is greatest. The narrow segments 81A–81D (corresponding to the recesses 92A–92F of FIG. 6) are located at the constrictions 71–73, whereas the deeper segments 80A–80E (corresponding to the upper surface portions 91E, 91F, and 91G of FIG. 6) are located at the full-thickness locations of the door 30. The upper major surface 91 of the component 70 is preferably attached to the bottom surface of the doorskin 31 by a suitable adhesive, as described below in greater detail.

Referring to FIG. 6, the core component of the invention generally has smooth and flat outer surfaces (e.g., the surface 91). Optionally, the core component 70 can have a texture on the portions of its outer surface 91 which will come into contact with or be glued to the inner surface of the man-made composite doorskins 31 and 31A. In some cases, such a texture can help in the adhesion of the core component 70 to the doorskins. Further, it may in some cases be advantageous to provide a contoured exterior surface, for example, an outer surface 91G having a series of ribs protruding from the surface 91 and running along the length or width of the core component 70.

According to a preferred embodiment of the invention, in addition to the recesses 92A–92F being able to accommodate the depressions 32–37 of the six-panel door 30 of FIG. 2, the recesses 92 are at the same time able to accommodate the depressions of various other styles of paneled doors (for example, the depressions 12, 13 in the door 10 of FIG. 1).

With this feature, the core component can be utilized in conjunction with any doorskin that lacks depressions or constrictions (e.g., the constrictions 71–74 in FIG. 4) in locations where the deeper portions 80 are located. A single, integrated design of core component (a so-called "master" or "universal" core component) can then be utilized with multiple styles of paneled doorskins. The integration of designs can be accomplished by taking into account all of the desired styles of doors; whenever one style of door dictates a contour or depression, the master core component will be manufactured to have a recessed zone 92 at that location. FIG. 7 illustrates this feature of the invention wherein a single core component 100 can be used with numerous styles of molded doorskins, e.g., with either of the doors 10 and 30 shown in FIGS. 1 and 2. The core component 100 of FIG. 7 includes a recessed zone 101 that can accommodate the depressions found in numerous different styles of paneled doors, including, for example, the contoured depressions 12 and 13 in FIG. 1 and the depressions 32–37 in FIG. 2. This allows the door manufacturer to directly interchange the core component 100 for use with any desired style of molded doorskin, avoiding the need for the door manufacturer to stock an inventory of multiple versions of the wood blanks.

FIG. 8 illustrates a core component having an alternative pattern that can accommodate various different styles of simulated paneled doors (e.g., various four- and six-paneled doors). The patterns illustrated in FIGS. 7 and 8 allow for doorskins (e.g., doorskins 10 and 30) having depressions that are both straight (e.g., the depression 32 in FIG. 2) and curved (e.g., as in the depression portion 14 in FIG. 1).

Preferred methods of manufacturing a man-made hardboard door product with a core component from composite soft board are described below. It is understood, however, that, as described above, the inventive core component can be used with building members other than composite doors. In addition, the inventive core component can be used in conjunction with a doorskin or door face made of materials other than fiberboard. Further, the cellulosic material selected for the core component is variable, depending upon the intended use of the core component. Suitable types of fiberboard material include soft board, medium-density fiberboard, hardboard, and oriented strandboard, as well as the other materials described above.

Still further, although the process described directly below is a dry process, the invention is not so limited, and the cellulosic core component can also be made by a wet or wet-dry processes. However, as will be understood by those of skill in the art, if a wet-felted process is utilized, it will likely be necessary to alter various of the process parameters (e.g., the amount and type of binder, press time, and/or press temperature) to compensate for the characteristics of such a process.

An exemplative dry process begins by first providing a suitable cellulosic filler, for example wood fiber having a moisture content of less than about 50 weight percent, based on the weight of dry fiber.

The fiber is blended with a suitable thermosetting resin binder. Any of the processes known in the art can be used to blend the wood fiber with the binder resin, including blowline feeding of the wood fiber and binder resin, or other mechanical means. For example, the cellulosic fibers may be first coated with the thermosetting resin binder by blowline addition. Air turbulence causes the binder to disperse onto the fibers. The resin-coated fibers are randomly formed into a mat by air blowing the coated fibers onto a support member to form a mat. The fibers, either before or after formation of the mat, can optionally be subjected to an evaporation step that usually includes the application of heat, to cause a portion of the water in the fiber to evaporate.

The amount of binder resin used in the process is generally less than 20 weight percent based on the weight of dry filler, but can vary depending upon the other process parameters and intended use of the final product. The binder resin is preferably used at about 0.5 to about five weight percent, and more preferably about one to about three weight percent, based upon the weight of the fibers. However, the amount is variable depending upon the other process parameters and desired final product. Numerous useful binders for the manufacture of fiberboard are known in the art, and include various modified and unmodified phenol-formaldehyde and urea-formaldehyde resins, including mixtures thereof. Examples of suitable binders are disclosed, for example, in Kirk-Othmer Encyclopedia of Chemical Technology, Vol. 15, pp. 176–208 (2nd Ed., 1970) and U.S. Pat. No. 5,367,040 to Teodorczyk (Nov. 22, 1994), the disclosures of which are hereby incorporated herein by reference. Various modifiers can be added to the binder resin, as known in the art.

A dry mat preferably has a moisture content of less than about 30 weight percent, and more preferably less than about 10 weight percent, based upon the dry weight of the fibers. The dry mat comprising wood fiber and binder resin can have a thickness of about two inches, for example; however, this thickness is widely variable depending upon the desired thickness of the consolidated product, the type of cellulosic material being used, and pressing conditions, as well as the other process parameters. The mat is then placed into a consolidating press.

Once placed in the press, the mat is molded under heat and pressure. The press temperature is preferably in the range of about 275° F. to about 550° F. (and more preferably about 390° F. to about 450° F.), and the press pressure is preferably in the range of about 400 psi to about 850 psi (more preferably 600 psi to about 800 psi). The press time is generally in the range of about 20 seconds to about 20 minutes (more preferably in the range of about 30 seconds to about 90 seconds). However, these conditions are variable depending upon the desired final product and that those of ordinary skill in the art will be able to make modifications based upon the desired final product. When exposed to this heat and pressure, the thermosetting resin will be cured and the mat will be compressed into an integral consolidated structure useful as a core component. The density of the soft board core component is preferably in the range of about 10 lbs/ft$^3$ to about 30 lbs/ft$^3$ (more preferably about 15 to about 30 lbs/ft$^3$, and most preferably about 16 to about 18 lbs/ft$^3$). The density of the pressed soft board can vary within the article; however, the variation is preferably minimal. The specific gravity of such an article can be in the range of about 0.2 to about 0.6, preferably about 0.2 to about 0.5, and most preferably about 0.3 to about 0.4. Although less preferred, the core component can be made of hardboard, which can have a density of about 45 lbs/ft$^3$ to about 60 lbs/ft$^3$, or medium density particleboard which can have a density of about 30 lbs/ft$^3$ to about 45 lbs/ft$^3$.

Other known processes can also be used to produce the wood composite material. For example, a wet process for the production of soft board can optionally be utilized. According to one such process, a wet mat of cellulosic material (preferably wood fiber) and a binder resin is formed. The wet mat has a moisture content of at least about forty weight percent, based on the weight of dry cellulosic material. A portion of the water from the wet mat is optionally removed in a draining step. The wet mat is then formed into a desired shape (e.g., a flat sheet), followed by drying by conventional means, e.g., in a kiln. In such a process, the use of pressure is optional.

According to a preferred method of the invention, a soft board "blank" is pressed from the cellulosic mat. A pressed soft board blank can be combined with (e.g., laminated with) additional pre-pressed blanks to achieve a desired thickness. The soft board wood blanks are preferably manufactured to a thickness of about ⅜ inch. The blanks can be laminated together to form any desired final thickness, preferably in the range of about one and one-eighth inch to about two inches, and more preferably about one and one-quarter inch to about one and three-quarter inch, e.g., about one and one-half inch. Any suitable adhesive, such as casein or polyvinylacetate, can be used to bond the laminates together.

The laminated soft board material is preferably machine routed as a post-press operation. The routing is desirable in order to provide the contours described above that can accommodate the various contours of a molded doorskin. A pattern such as described above is machined to a depth of about ½ inch into the soft board core material on each of its sides, to have the configuration shown in FIG. 6 or FIG. 7, for example. The distance between the routed depressions on opposite sides of the core component can be in the range of about one-eighth to about one-half inch.

The recessed or routed zones can have a bead or bead-and-cove design, e.g., as can be provided with the zones 12 and 13 of the doorskin 11 of FIG. 1. This operation is preferably utilized in conjunction with the above-described method for providing a "master" core component that can be used with multiple styles of doorskins. If necessary, the laminate is then cut to size to fit inside the stile and rail structure described above.

Once the inventive core component has been produced, it preferably will be assembled along with two doorskins and framing structure as described above. Although any type of doorskin can be utilized in accordance with the inventive method and article, conventional hardboard doorskins having a thickness of about one-eighth inch are preferred.

Many different sizes of core components can be produced in accordance with the invention. For example, a core component having a thickness of about one and one-eighth inch can be placed on the interior of a doorskin assembly having an external thickness of about one and three-eighth inch. Such a door is preferably used for interior applications. A core component having a thickness of about one and one-half inch can be placed on the interior of a doorskin assembly having an exterior thickness of about one and three-quarter inch. Such a door provides greater mass and protection, and can be used as an interior door or an exterior door, and for various commercial and industrial applications.

Preferred adhesives for bonding the door components include, for example, casein or polyvinylacetate, and their derivatives. The adhesive is preferably placed at all locations where the doorskins and/or the framing members come into contact with the core component 70. The inventive door preferably uses a rail and stile supporting structure. However, it is contemplated that the need for a lock block might be avoided through the use of the inventive process.

As described above, the inventive core component preferably provides a door product or other building member, with beneficial weight and sound insulation properties. The core component also can provide substantial structural stability. A door comprising fiberboard doorskins and the inventive core component will preferably have the same feel and ability to swing shut (e.g., as a result of a desirable weight) as a natural wood door. Further, the sound insulation and fire retardance properties of the door are preferably greatly improved over the properties of a similar door which lacks the inventive core component.

The articles described herein are most preferably formed from a substrate that includes at least one layer of cellulosic fiber and a binder. However, similar articles to those specifically described herein can be formed by contouring (e.g., by molding or extruding) other materials from thermoplastic or thermosetting polymers, e.g., polyethylene or polypropylene with or without reinforcing fibers, such as fiberglass or cellulosic materials. Thus, articles made from other materials can incorporate the features of the core component, as described herein for cellulosic articles.

The material for the core component should be selected depending, for example, on the desired application of the core component. Some materials will be more extensible and/or flexible, while having less internal strength. Other materials, such as many fiberboard materials, will have a high internal strength relative to other products (e.g., many polymers and plastics), but might have a relatively lower extensibility and/or flexibility. When the core components described herein are manufactured with a fiberboard material, a high-strength article suitable for many types of structural components can be produced.

For many applications, a core component made from a composite cellulosic material (e.g., fiberboard) will be preferred over various polymers or plastics, for example, due to a potential advantage of the strength of the final product on a per unit cost basis.

The foregoing description is given for clearness of understanding only, and no unnecessary limitations should be understood therefrom, as modifications within the scope of the invention will be apparent to those skilled in the art.

We claim:

1. A contoured core component adapted to be contained within a structural member defining an internal void having a depth varying at two or more locations thereof, said component comprising:
   (a) two major exterior surfaces defining respective front and rear sides of said component; and
   (b) at least one depression in each major surface projecting inwardly therefrom;
   wherein (i) said core component is a solid, integral structure formed from composite sheet material comprising at least 90 weight percent wood fibers and having a density in the range of about 10 lbs./ft.$^3$ to about 30 lbs./ft.$^3$ and (ii) said depressions are located in a predetermined arrangement to accommodate each of said variations in depth of said structural member.

2. The core component of claim 1, wherein:
said core component is adapted to be contained within a structural member having a front side which is the mirror image of a rear side.

3. The core component of claim 1, wherein:
said core component has four edges surrounding each of said major exterior surfaces, and both of said major surfaces include one or more interior depressions that do not extend to an outer edge of the core component.

4. The core component of claim 1, wherein each of said depressions comprises:
   (i) a first, inclined depression wall having an upper surface integral with, and extending downwardly from, said major surface;
   (ii) a depression bottom wall having an upper surface integral with, and extending from, said upper surface of said first inclined wall; and
   (iii) a second, inclined depression wall having an upper surface integral with, and extending from, both of (A) said depression bottom wall surface and (B) said major surface.

5. The core component of claim 4, wherein:
each of said inclined depression wall surfaces intersects with said bottom wall surface at an angle in the range of about twenty to about sixty degrees.

6. The core component of claim 4, wherein:
each of said inclined depression wall surfaces intersects with said bottom wall surface at an angle in the range of about thirty to about fifty degrees.

7. The core component of claim 4, wherein:
each of said inclined depression wall surfaces intersects with said bottom wall surface at an angle of about ninety degrees.

8. The core component of claim 4, wherein:
each of said two inclined walls and said bottom wall is substantially planar.

9. The core component of claim 4, wherein:
said surface of each of said first and second inclined depression walls is in a bead and cove pattern between upper and lower ends thereof.

10. The core component of claim 1, wherein:
said core component comprises a thermoset resin binder selected from the group consisting of modified and unmodified phenol-formaldehyde resins, modified and unmodified urea-formaldehyde resins, and mixtures thereof.

11. The core component of claim 10, wherein:
said core component has a substantially uniform density throughout the interior thereof.

12. The core component of claim 1, wherein:
said core component has a specific gravity in the range of about 0.2 to about 0.6.

13. The core component of claim 1, wherein:
said core component lacks a cellular reinforcement material within the core component.

14. The core component of claim 1, wherein:
said depressions are located in said predetermined arrangement; and
said arrangement is adapted so that said core component is able to be alternatively inserted into at least two different styles of structural members having different internal void dimensions.

15. The core component of claim 14, wherein:
said core component having said predetermined arrangement is able to be alternatively inserted into the interior void formed by any of the following doorskins: two-panel doorskins, three-panel doorskins, four-panel doorskins, five-panel doorskins, and six-panel doorskins.

16. A structural member system, comprising:
(a) a structural member shell defining an interior void having a depth varying at two or more locations thereof; and
(b) a contoured core component adapted to be contained within said shell and comprising:
(i) two major exterior surfaces defining respective front and rear sides of said core component; and
(ii) at least one depression in each major surface projecting inwardly therefrom;
wherein said core component is a solid, integral structure comprising at least 90 weight percent wood fibers and having a density in the range of about 10 lbs./ft.$^3$ to about 30 lbs./ft.$^3$ and said depressions are located in a predetermined arrangement to accommodate each of said variations in depth of said structural member shell.

17. The structural member system of claim 16, wherein:
said structural member shell has two major interior surfaces; and
said core component is attached to said major interior surfaces of said structural member with a binder material, such that each major exterior surface of said core component has substantially continuous contact with a corresponding major interior surface of said structural member shell adjacent said core component.

18. A door, comprising:
(I) a doorskin face and a doorskin back, wherein each of said doorskins has a contoured inner surface and a contoured outer surface and is formed of a molded composite cellulosic material, said doorskins defining an interior void therebetween, said void having a depth varying at two or more locations thereof; and
(II) a core pre-form component disposed in said interior void and comprising cellulosic material and sufficient binder to adhere the cellulosic material together into a structurally sound member comprising at least 90 weight percent wood fibers and having a density in the range of about 10 lbs./ft.$^3$ to about 30 lbs./ft.$^3$, said core component comprising:
(a) two major exterior surfaces defining respective front and rear sides of said component; and
(b) at least one depression in each major surface projecting inwardly therefrom;
wherein said depressions are located in a predetermined arrangement to accommodate each of said variations in depth of said interior void.

19. The door of claim 18, wherein said doorskin face and doorskin back each comprise:
a planar doorskin wall; and
a plurality of molded depressions in said doorskin wall, said depressions including an inclined wall having an upper surface integral with an upper surface of said doorskin wall, said inclined wall extending downwardly from said doorskin wall toward a bottom wall of said depression and said bottom wall having an upper surface integral with a lower end of said upper surface of said inclined wall.

20. A method for the preparation of a consolidated cellulosic article useful as a core component for a structural member, comprising the steps of:
(a) combining a fibrous cellulosic filler and a binder resin in an amount sufficient to adhere the cellulosic filler together into a structurally sound article;
(b) placing the product of step (a) into a mold cavity;
(c) compressing the cellulosic material and binder in said cavity under elevated temperature to cure said binder resin and consolidate said cellulosic material into a structurally sound blank member having two opposing major planar surfaces, said blank member comprising at least 90 weight percent wood fibers and having a density in the range of about 10 lbs./ft.$^3$ to about 30 lbs./ft.$^3$;
(d) removing said blank member from said cavity; and
(e) providing, after step (d), at least one interior depression in each major surface of said consolidated blank member to form a core component having front and rear sides, said depressions projecting inwardly from said major planar surfaces such that the rear side of the core component is the mirror image of the front side.

21. The method of claim 20, further comprising the step of:
(f) binding said blank member to another blank member prior to step (e).

22. The method of claim 20, wherein the depression in said article comprises:
(i) a first, inclined depression wall having an upper surface integral with, and extending downwardly from, said major plane;
(ii) a depression bottom wall having an upper surface integral with, and extending from, said upper surface of said first inclined wall; and
(iii) a second, inclined depression wall having an upper surface integral with, and extending from, both of (A) said depression bottom wall surface and (B) said major plane.

23. A method for the preparation of a consolidated cellulosic article useful as a core component for a structural member defining an internal void having a depth varying at two or more locations thereof, comprising the steps of:
(a) forming a mat by combining a cellulosic filler and a binder resin in an amount sufficient to adhere the cellulosic filler together into a structurally sound article;
(b) placing the product of step (a) into a mold cavity;
(c) compressing the cellulosic material and binder in said cavity under elevated temperature to cure said binder resin and consolidate said cellulosic material into said structurally sound consolidated article having a shape which corresponds to the shape of said mold cavity and comprising at least 90 weight percent wood fibers and having a density in the range of about 10 lbs./ft.$^3$ to about 30 lbs./ft.$^3$; and
(d) molding said cellulosic filler and binder in said mold cavity to include:
(i) two major exterior surfaces defining respective front and rear sides of said component; and
(ii) at least one depression in each major surface projecting inwardly therefrom;
wherein said depressions are located in a predetermined arrangement to accommodate each of said variations in depth of said structural member.

24. The method of claim 23, wherein:

the resin binder is included in the mat in an amount of about 1% to about 15%, based on the total dry weight of the mat.

25. The method of claim 23, wherein:

said cellulosic filler comprises fibrillated cellulosic fibers.

26. A method for the preparation of a composite cellulosic article useful as a core component for a structural member defining an internal void having a depth varying at two or more locations thereof, comprising the steps of:

(a) combining a cellulosic filler, a binder resin, and sufficient water to form a wet mat;

(b) subjecting said wet mat to elevated temperature to cure said binder resin and form said mat into a structurally sound core component having two opposing major planar surfaces, said component comprising at least 90 weight percent wood fibers and having a density in the range of about 10 lbs./ft.$^3$ to about 30 lbs./ft.$^3$;

(c) molding said cellulosic filler and binder in step (b) to include:

(i) two major exterior surfaces defining respective front and rear sides of said component; and (ii) at least one depression in each major surface projecting inwardly therefrom;

wherein said depressions are located in a predetermined arrangement to accommodate each of said variations in depth of said structural member.

27. A core component adapted to be contained within a structural member defining an internal void having a depth varying at two or more locations thereof, said component comprising:

(a) two major exterior surfaces defining respective front and rear sides of said component; and (b) at least one depression in each major surface projecting inwardly therefrom, each of said depressions comprising: (i) a first, inclined depression wall having an upper surface integral with, and extending downwardly from, said major surface; (ii) a depression bottom wall having an upper surface integral with, and extending from, said upper surface of said first inclined wall; and (iii) a second, inclined depression wall having an upper surface integral with, and extending from, both of (A) said depression bottom wall surface and (B) said major surface and wherein each of said depression wall surfaces intersects with said bottom wall surface at an angle in the range of about twenty to about sixty degrees; and wherein (i) said core component is a solid, integral structure formed from consolidated composite sheet material comprising at least 90 weight percent wood fibers and (ii) said depressions are located in a predetermined arrangement to accommodate each of said variations in depth of said structural member.

28. The core component of claim 27, wherein:

each of said depression wall surfaces intersects with said bottom wall surface at an angle in the range of about thirty to about fifty degrees.

29. The core component of claim 27, wherein:

said consolidated composite sheet material has a density in the range of about 10 lbs./ft.$^3$ to about 30 lbs./ft.$^3$.

30. The core component of claim 27, wherein:

said surface of each of said first and second inclined depression walls is in a bead and cove pattern between upper and lower ends thereof.

31. The core component of claim 27, wherein:

said depressions are located in said predetermined arrangement; and said arrangement is adapted so that said core component is able to be alternatively inserted into at least two different styles of structural members having different internal void dimensions.

32. The core component of claim 31, wherein:

said core component having said predetermined arrangement is able to be alternatively inserted into the interior void formed by any of the following doorskins: two-panel doorskins, three-panel doorskins, four-panel doorskins, five-panel doorskins, and six-panel doorskins.

33. The core component of claim 27, wherein:

said core component has a specific gravity in the range of about 0.2 to about 0.6.

34. The core component of claim 27, wherein:

said core component has a substantially uniform density throughout the interior thereof.

35. The core component of claim 27 wherein:

said core component is formed from a composite fiberboard material having a density in the range of about 10 lbs./ft$^3$ to about 30 lbs./ft$^3$.

36. The core component of claim 27 wherein:

said core component is formed from a composite medium-density fiberboard material having a density in the range of about 30 lbs./ft$^3$ to about 40 lbs./ft$^3$.

37. A composite door comprising the core component of claim 27.

38. A core component adapted to be contained within a structural member defining an internal void having a depth varying at two or more locations thereof, said core component comprising:

(a) two major exterior surfaces defining respective front and rear sides of said component; and (b) at least one depression in each major surface projecting inwardly therefrom, said depressions being located in a predetermined arrangement to accommodate said two or more variations in depth and said arrangement is adapted so that said core component is able to be alternatively inserted into at least two different styles of structural members having different internal void dimensions; and wherein said core component is a solid structure formed from composite cellulosic sheet material.

39. The core component of claim 38, wherein:

said core component having said predetermined arrangement is able to be alternatively inserted into the interior void formed by any of the following doorskins: two-panel doorskins, three-panel doorskins, four-panel doorskins, five-panel doorskins, and six-panel doorskins.

40. A method for the preparation of a consolidated cellulosic article useful as a core component for a structural member defining an internal void having a depth varying at two or more locations thereof, comprising the steps of:

(a) forming a mat by combining a cellulosic filler and a binder resin in an amount sufficient to adhere the cellulosic filler together into a structurally sound article;

(b) placing the product of step (a) into a mold cavity;

(c) compressing the cellulosic material and binder in said cavity under elevated temperature to cure said binder resin and consolidate said cellulosic material into a structurally sound consolidated article having a shape which corresponds to the shape of said mold cavity; and (d) molding said cellulosic filler and binder in said mold cavity to include:
  (i) two major exterior surfaces defining respective front and rear sides of said component; and
  (ii) at least one depression in each major surface projecting inwardly therefrom, each of said depressions comprising: (A) a first, inclined depression wall having an upper surface integral with, and extending downwardly from, said major surface; (B) a depression bottom wall having an upper surface integral with, and extending from, said upper surface of said first inclined wall; and (C) a second, inclined depression wall having an upper surface integral with, and extending from, both of (1) said depression bottom wall surface and (2) said major surface and wherein each of said depression wall surfaces intersects with said bottom wall surface at an angle in the range of about twenty to about sixty degrees;

wherein said core component is a solid, integral structure formed from consolidated composite sheet material comprising at least 90 weight percent wood fibers and said depressions are located in a predetermined arrangement to accommodate each of said variations in depth of said structural member.

41. The method of claim 40, wherein said consolidated cellulosic article has a density in the range of about 10 lbs./ft.$^3$ to about 30 lbs./ft.$^3$.

* * * * *